May 9, 1939.  L. E. WILSON  2,157,723
FORCE MEASURING DEVICE
Filed June 6, 1936
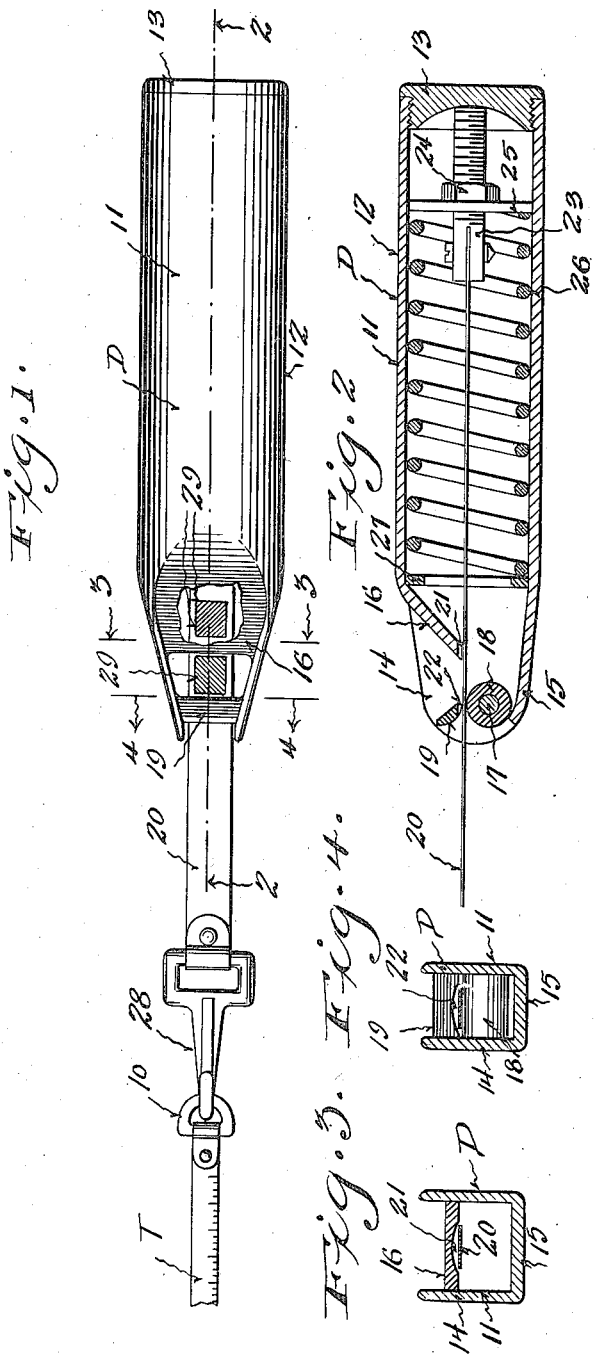

Patented May 9, 1939

2,157,723

UNITED STATES PATENT OFFICE 2,157,723

FORCE MEASURING DEVICE

Lewis E. Wilson, Milwaukee, Wis.

Application June 6, 1936, Serial No. 83,924

4 Claims. (Cl. 265—63)

This invention appertains to geometric instruments, and more particularly to a flexible graduated tape of the character used by surveyors and others for measuring long distances.

Difficulty is experienced with the use of flexible steel measuring tapes, in that these tapes tend to sag when used over any great distance, and the same cannot be properly tensioned with any great degree of satisfaction. The tapes, as manufactured, are supposed to measure exactly one hundred feet when supported and under a tension of, say, five pounds, or when suspended from their ends and under a tension, of, say, twelve pounds. These figures vary with different manufacturers. Also, the cheaper tapes vary in manufacture, so that instead of twelve pounds, it may be found necessary to put a tension of fifteen or twenty pounds on a tape in order that it measure exactly one hundred feet.

It is therefore one of the primary objects of my invention to provide a novel spring tensioned device, which can be readily and quickly attached to one end of a steel measuring tape for facilitating the pulling of the tape, and for quickly indicating the exact number of pounds pulled thereon, so that the tape can be expeditiously drawn to a true taut measuring condition.

Another salient object of my invention is to provide novel means for indicating the amount of give in the tensioning device, so that the distance will be correctly measured, and whereby undue pull on the tape to the breaking point will be avoided.

A further object of my invention is to provide a pull handle for flexible steel measuring tapes having a spring tensioning device, and an indicating device incorporated therewith for facilitating the pulling of the tape to a proper taut position.

A further important object of my invention is to provide a spring tensioning device, which can be incorporated in a tape or connected to one end thereof, and which can receive the usual leather thong handle generally used by the man handling the flexible tape.

A still further object of my invention is to provide a novel tensioning device for flexible tapes of the above character, which will be durable and efficient in use, one that will be simple and easy to manufacture, and one which can be placed upon the market and incorporated with a tape at a small cost.

With these and other objects in view, the invention consists in the novel construction, arrangement, and formation of parts, as will be hereinafter more specifically described, claimed, and illustrated in the accompanying drawing, in which drawing:

Figure 1 is a top plan view of my improved tensioning handle, showing the same detachably connected with a standard flexible measuring tape, a part of the handle being shown broken away to illustrate the indicating device.

Figure 2 is a longitudinal section through the tensioning handle, taken on the line 2—2 of Figure 1, looking in the direction of the arrows.

Figure 3 is a transverse section through the handle, taken on the line 3—3 of Figure 1, looking in the direction of the arrows.

Figure 4 is a transverse section through the tensioning device, taken on the line 4—4 of Figure 1, looking in the direction of the arrows.

Referring to the drawing in detail, wherein similar reference characters designate corresponding parts throughout the several views, the letter D generally indicates my novel tensioning device for a flexible steel tape T.

The tape T is of the standard type, and one end of the same has attached thereto an eye or loop 10. In ordinary practice, a leather thong or strap is placed through the loop or eye to form a handle. In one form of my invention, I eliminate the leather handle entirely and substitute my improved tensioning device D therefor, which will now be described in detail.

My improved tensioning device D comprises a handle 11, which may include a hollow sleeve-like body 12 normally closed at one end by a threaded plug 13. If preferred or desirable, the outer face of the hollow sleeve-like body 12 can be suitably treated so as to permit a firm grip to be obtained thereon by an operator.

The forward end of the body 12 is provided with forwardly extending converging side walls or wings 14 and a bottom connected wall 15 therefor. These walls 14 and 15 form an extension of the body, and the body also has formed thereon a downwardly inclined lip 16, which leads toward the longitudinal center of the body. This lip terminates decidedly short of the forward ends of the wings or side walls 14.

Extending transversely across the handle 11 is a pin 17, which is rigidly anchored to the wings or side walls 14 adjacent to their forward terminals, and this pin rotatably supports a hardened anti-friction guide roller 18.

Directly above the roller 18 is arranged an inclined guide bar 19. This bar also extends transversely across the handle and is firmly anchored to the wings or walls 14. The space between the bar 19 and the roller 18 defines a guideway for the tensioning tape 20, which can be formed from the same material as the steel measuring tape T, if so preferred.

The tensioning tape 20 extends into the handle under the lip 16, and the inner edges of the lip 16 and the bar 19 can be slightly arcuated, as indicated by the reference characters 21 and 22, so as to prevent undue wear on the tensioning tape and on said lip and guide bar. The front face of the bar 19 is curved to prevent the kinking and breaking of the tape. The inner end of the tensioning tape 20 is rigidly anchored to a short pull rod 23 having threaded thereon an adjustable nut 24. Seated against the nut is a thrust washer 25, which forms a seat for the inner end of a relatively heavy contractile coil spring 26. The forward end of the spring 26 seats against an annular washer 27 secured in the forward end of the handle. The outer end of the tensioning tape 20 carries a snap hook 28 for receiving the eye or loop 10 of the measuring tape.

In use of my improved device, when the tape T is to be used, the hook 28 is connected with the eye 10 and the tape T is laid over the ground to be measured. The handle 11 is now grasped by the operator and pull is exerted on said handle to take up the slack and sag in the tape T. This movement will be resisted by the spring 26, and any undue pull on the tape T will be taken up by said spring to prevent breakage of the tape T.

To indicate the amount of tension, the tension tape 20 can be provided with spaced indicating zones 29 of different colors. Thus, as these zones appear between the lip 16 and the bar 19, the same will indicate to the user of the tape the amount of pull and the limit of the amount of pull which can be placed upon the measuring tape. The zones 29 are substantially equal in size to the distance between the lip 16 and the bar 19; hence, a one-quarter or a one-half part of a zone appearing in the reading space will readily indicate a certain number of pounds. With my device the exact number of pound tension required for different tapes can be expeditiously placed thereon.

Obviously, the nut 24 can be initially set to tension the spring 26 to the desired degree.

From the foregoing description, it can be seen that I have provided an exceptionally simple and durable tensioning device for use with flexible steel measuring tapes.

Changes in details may be made without departing from the spirit or the scope of my invention, but what I claim as new is:

1. A tensioning device including a hollow pull handle, a tension tape received in said handle having indications thereon, an article engaging member carried by the forward end of the tension tape, an expansion spring in said handle having one end engaging a stop therein, a pull rod connected to the inner end of the tension tape, an adjustable stop on the pull rod engaging the opposite end of the spring, and a guide for the tensioning tape carried by the forward end of the handle including a roller on which the tensioning tape rides and a guide bar above the roller and means at the forward end of the handle including the guide bar for facilitating the reading of the indications on the tensioning tape.

2. A tensioning device including a hollow pull handle, a tension tape received in said handle having indications thereon, an article engaging member carried by the forward end of the tension tape, an expansion spring in said handle having one end engaging a stop therein, a pull rod connected to the inner end of the tension tape, an adjustable stop on the pull rod engaging the opposite end of the spring, a guide for the tensioning tape carried by the forward end of the handle including a roller on which the tensioning tape rides and a guide bar above the roller, and a guide lip inward of said bar, the lower edges of the bar and lip being arcuated said bar and lip being spaced to facilitate the readings on the tensioning tape.

3. A tensioning device including a hollow pull handle, a tensioning tape received in said handle having indications thereon, an article engaging member carried by the forward end of the tensioning tape, an expansion spring in said handle having one end engaging a stop therein, a pull rod connected to the inner end of the tensioning tape, a stop on the pull rod engaging the opposite end of the spring, a guide for the tensioning tape carried by the forward end of the handle, including a roller on which the tensioning tape rides, and a guide bar above the roller, and a guide lip inward of the bar, the space between the lip and the bar constituting a sight window for facilitating the reading of the indications on the tensioning tape.

4. A tensioning device including a hollow pull handle, the outer face of which constitutes a hand grip, forwardly extending converging wings formed on the inner end of the handle, and a downwardly inclined loop formed on the handle disposed between the wings, a tensioning tape received in said handle having indications thereon, an article engaging member carried by the forward end of the tensioning tape, an expansion spring in said handle having one end engaging the stop therein, a pull rod connected to the inner end of the tensioning tape, a stop on the pull rod engaging the opposite end of the spring, and a guide for the tensioning tape carried by the forward end of the handle including a lip and a roller on which the tensioning tape rides, and a guide bar above the roller, the guide bar being disposed in spaced relation to the lip, the space between the lip and guide bar constituting a sight window for reading the indications on the tensioning tape.

LEWIS E. WILSON.